United States Patent
Nakajima et al.

(10) Patent No.: US 10,906,063 B2
(45) Date of Patent: *Feb. 2, 2021

(54) POWDER RESIN COATING DEVICE AND POWDER RESIN COATING METHOD

(71) Applicant: HONDA MOTOR CO., LTD., Tokyo (JP)

(72) Inventors: Junji Nakajima, Tochigi (JP); Nozomu Tanaka, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 16/183,881

(22) Filed: Nov. 8, 2018

(65) Prior Publication Data

US 2019/0134661 A1 May 9, 2019

(30) Foreign Application Priority Data

Nov. 9, 2017 (JP) ................. 2017-216589

(51) Int. Cl.
*B05D 1/18* (2006.01)
*B05C 19/00* (2006.01)
(Continued)

(52) U.S. Cl.
CPC ............... *B05C 19/008* (2013.01); *B01J 8/24* (2013.01); *B05C 11/1007* (2013.01);
(Continued)

(58) Field of Classification Search
CPC ...... B01J 8/24; B05C 11/1007; B05C 19/008; B05C 19/02; B05D 1/18; B05D 1/24
See application file for complete search history.

(56) References Cited

U.S. PATENT DOCUMENTS

2003/0044524 A1* 3/2003 Hoffland ............... B05C 19/025
427/180
2006/0134319 A1 6/2006 Itatani et al.

FOREIGN PATENT DOCUMENTS

CN 1802221 7/2006
JP S61-287470 A 12/1986
(Continued)

OTHER PUBLICATIONS

Japanese Office Action dated Jun. 4, 2019, 3 pages.
Chinese Office Action dated Jul. 1, 2020, 8 pages.

Primary Examiner — Alexander M Weddle
(74) Attorney, Agent, or Firm — Rankin, Hill & Clark LLP

(57) ABSTRACT

A powder resin coating device and method that can make the powder surface of powder resin within a powder fluidizing bed flat without spattering. The powder resin coating device includes: a powder fluidizing bed storing powder resin; a vibration mechanism connected to a bottom surface of the powder fluidizing bed; and a support member connecting the powder fluidizing bed and a fixing surface. The vibration mechanism includes: a vibration unit, and a connection mechanism connecting the vibration unit and bottom surface of the powder fluidizing bed. The support member elastically supports the powder fluidizing bed to the fixing surface and is mounted more inwards in a radial direction than an edge part of the powder fluidizing bed. The vibration unit is connected to the bottom surface via the connection mechanism so that a vibration motor rotations shaft is substantially coaxial with an axis of the powder fluidizing bed.

3 Claims, 11 Drawing Sheets

(51) Int. Cl.
  *B01J 8/24*  (2006.01)
  *B05C 19/02* (2006.01)
  *B05C 11/10* (2006.01)
  *B05D 1/24*  (2006.01)
(52) U.S. Cl.
  CPC .............. *B05C 19/02* (2013.01); *B05D 1/18* (2013.01); *B05D 1/24* (2013.01)

(56) References Cited

FOREIGN PATENT DOCUMENTS

| | | |
|---|---|---|
| JP | H10-287827 A | 10/1998 |
| JP | 2003-290691 A | 10/2003 |
| JP | 2011-139992 | 7/2011 |
| JP | 2011-234240 | 11/2011 |
| JP | 2011-235240 | 11/2011 |

* cited by examiner

CMPARATIVE EXAMPLE

EXAMPLE

POWDER RESIN COATING DEVICE AND POWDER RESIN COATING METHOD

This application is based on and claims the benefit of priority from Japanese Patent Application No. 2017-216589, filed on 9 Nov. 2017, the content of which is incorporated herein by reference.

BACKGROUND OF THE INVENTION

Field of the Invention

The present invention relates to a powder resin coating device and a powder resin coating method. In more detail, it relates to a powder resin coating device and a powder resin coating method used upon forming a coating film on a workpiece based on a fluidized bed coating process.

Related Art

Fluidized bed coating process is one of the coating techniques for forming a coating film on a workpiece. In more detail, the fluidized bed coating process immerses a workpiece which has been heated in advance into a powder fluidizing bed in which the powder resin is flowing, and causes the powder resin to deposit on the surface of the workpiece by way of the heat thereof, thereby forming a coating film.

In this way, with fluidized bed coating process, if slants or surface irregularities exist in the surface of the powder resin (hereinafter referred to simply as "powder surface") stored within the powder fluidizing bed due to the coating film being formed at a portion immersing the workpiece in the powder resin, a portion at which the coating film is not sufficiently formed will occur, and the quality of the final product may decline. Therefore, in recent years, the slants and surface irregularities in the powder surface are decreased by causing this powder fluidizing bed to vibrate, while supplying air inside the powder fluidizing bed from a bottom surface (for example, refer to Japanese Unexamined Patent Application, Publication No. 2011-234240).

SUMMARY OF THE INVENTION

However, with the powder resin coating device of Japanese Unexamined Patent Application, Publication No. 2011-234240, the powder fluidizing bed is excited in the horizontal direction by a horizontal excitation means provided directly to the bottom of the powder fluidizing bed. For this reason, with the powder resin coating device of Japanese Unexamined Patent Application, Publication No. 2011-234240, the powder resin may jump at the edge part of the powder fluidizing bed, if increasing the excitation amplitude by a horizontal excitation means so that the powder surface becomes flat. In addition, when decreasing the excitation amplitude so that powder resin does not spatter, it may no longer be able to make the powder surface sufficiently flat.

The present invention has an object of providing a powder resin coating device and powder resin coating method which can make the powder surface flat without the powder resin in the powder fluidizing bed spattering.

A powder resin coating device (for example, the powder resin coating device 1 described later) according to a first aspect includes: a bed (for example, the powder fluidizing bed 2 described later) which stores powder resin; a vibration mechanism (for example, the vibration mechanism 5 described later) which is connected to a bottom surface (for example, the bottom surface 22a described later) of the bed; and a support member (for example, the support member 36 described later) which connects the bed and a fixing surface (for example, the fixing surface 333 described later), in which the vibration mechanism includes an oscillating body (for example, the vibration unit 51 described later), and a connection mechanism (for example, the connection mechanism 55 described later) which connects the oscillating body and the bottom surface, and the support member elastically supports the bed to the fixing surface.

According to a second aspect of the present invention, in this case, it is preferable for the support member to be mounted more inwards in a radial direction than an edge part (for example, the edge part 21a described later) of the bed.

According to a third aspect of the present invention, in this case, it is preferable for oscillating body to include a vibration motor (for example, the vibration motor 53 described later) having an eccentric rotation shaft (For example, the rotation shaft 52 described later), and a housing (for example, the housing 54 described later) which accommodates the vibration motor, the connection mechanism to connect the housing and the bottom surface, and the vibration motor to be connected to the bottom surface via the connection mechanism so that the rotation shaft is substantially coaxial with a central axis (for example, the axis line O described later) of the bed.

According to a fourth aspect of the present invention, in this case, it is preferable for a distance (for example, the distance L1 described later) along an axial direction from the center (for example, the center point Q1 described later) of the vibration motor until a first connection part (for example, the first connection part P1 described later) of the connection mechanism and the bottom surface to be longer than a distance (for example, the distance L2 described later) along a horizontal direction which is perpendicular to the axial direction, from the central axis until a second connection part (for example, the second connection part P2 described later) of the bed and the support member.

According to a fifth aspect of the present invention, in this case, it is preferable for the connection mechanism to include: a first support plate (for example, the first support plate 561 described later) and a second support plate (For example, the second support plate 562 described later) which respectively are connected to a pair of opposing sides of the housing, and extend in parallel to each other, and a connection shaft member (for example, the connection shaft member 58 described later) which connects an end (for example, the third support plate 563 described later) of the first and second support plates on a side of the bed and the bottom surface, and distances along the horizontal direction from the rotation shaft until the first and second support plates to be equal.

According to a sixth aspect of the present invention, in this case, it is preferable for the bed to be substantially circular in a plan view, and the connection shaft member to be substantially coaxial with the center axis, and is a truncated cone shape that expands in diameter from a side of the first and second support plates towards a side of the bottom surface.

According to a seventh aspect of the present invention, in this case, it is preferable for the bed to be substantially circular in a plan view, and a distance along the axial direction from the bottom surface until an edge part of the bed to be no more than the diameter of the bed.

A powder resin coating method according to an eighth aspect of the present invention for coating a powder resin onto a workpiece using a powder resin coating device (for example, the powder resin coating device 1 described later) which includes a bed (for example, the powder fluidizing bed 2 described later) storing powder resin and a vibration mechanism (for example, the vibration mechanism 5 described later) connected to a bottom surface (for example, the bottom surface 22a described later) of the bed, in which the method includes immersing a coating site of the workpiece in the powder resin stored within the bed, while vibrating the bed using the vibration mechanism so that acceleration along a vertical direction is greater than acceleration along a horizontal direction of the bed, thereby coating powder resin onto the coating site.

According to a ninth aspect of the present invention, in this case, it is preferable to make the bed to vibrate using the vibration mechanism upon immersing the coating site of the workpiece in the powder resin stored in the bed, so that acceleration and displacement along the vertical direction of the bed are both greater than acceleration and displacement along the horizontal direction of the bed.

A powder resin coating method according to a tenth aspect of the present invention for coating a powder resin onto a workpiece using a powder resin coating device (for example, the powder resin coating device 1 described later) which includes a bed (for example, the powder fluidizing bed 2 described later) storing powder resin and a vibration mechanism (for example, the vibration mechanism 5 described later) connected to a bottom surface (for example, the bottom surface 22a described later) of the bed, in which the method includes: supplying air to a bottom surface of a powder storage unit of the bed, while causing the bed to vibrate using the vibration mechanism so that acceleration and displacement along a vertical direction of the bed increase from a center of the bed towards an edge part (for example, the edge part 21a described later) of the bed, and immersing a coating site (for example, the coating site W3 described later) of the workpiece (for example, the workpiece W described later) into powder resin which is stored within the bed, thereby coating powder resin onto the coating site.

According to the powder resin coating device of the first aspect of the present invention, the oscillating body is connected to the bottom surface of the bed which stores the powder resin via the connection mechanism, and this bed is further connected to the fixing surface via the support member. In particular, with the powder resin coating device of the present invention, the support member elastically supports the bed to the fixing surface. For this reason, the present invention can realize oscillatory movement of the bed in which the vibration along the horizontal direction and vibration along the vertical direction are integrally combined when vibrating the oscillating body. For this reason, according to the powder resin coating device of the present invention, it is possible to make the powder surface flat without allowing the powder resin within the bed to spatter.

According to the second aspect, as explained by referencing FIGS. 9 to 12, etc. later, it is possible to effectively flatten the powder resin within the bed, when realizing the oscillatory movement in which the vibration along the vertical direction is larger than the vibration along the horizontal direction. Therefore, in the powder resin coating device of the present invention, the support member is installed more inwards in the radial direction than the edge part of the bed. Since it is thereby possible to make the amplitude of vibration along the vertical direction of the bed larger compared to a case of installing the support member more outwards in the radial direction than the edge part of the bed, the powder surface can be made flat without allowing the powder resin within the bed to spatter.

The powder resin coating device according to the third aspect of the present invention configures the oscillating body by the vibration motor having the eccentric rotation shaft, and the housing which accommodates this. In addition, this vibration motor is connected to the bottom surface of the bed via the connection mechanism so that the rotation shaft becomes substantially coaxial with the central axis of the bed. It is thereby possible to easily realize oscillatory movement of the bed, and thus possible to further flatten the powder surface of powder resin within the bed.

According to the powder resin coating device of the fourth aspect of the present invention, the vibration motor is connected to the first connection part at the bottom surface of the bed via the connection mechanism, and the fixing surface is connected to the second connection part of the bed via the support member. The vibration motor is connected by the first connection part of the bottom surface via the connection mechanism so that the rotation shaft thereof is substantially coaxial with the central axis of the bed. In particular, with the powder resin coating device, the distance along the axial direction from the center of the vibration motor until the first connection part of the bottom surface of the bed is longer than the distance along the horizontal direction from the central axis of the bed until the second connection part. For this reason, when causing the vibration motor to rotate, the bed vibrates at greater acceleration along the vertical direction than the horizontal direction, and as a result thereof, makes oscillatory movement such that the bottom surface of the bed slopes relative to the fixing surface about the first connection part. For this reason, according to the powder resin coating device of the present invention, it is possible to make the powder surface flat without allowing the powder resin within the bed to spatter.

According to the powder resin coating device of the present invention of the fifth aspect, the housing of the vibration motor is equally sandwiched by at least two support plates centered about the rotation shaft thereof. Therefore, when causing the eccentric rotation shaft to rotate by the vibration motor, it is possible to equally transmit the vibration along the vertical direction centered about the first connection part to the bottom surface of the bed, via the above-mentioned two support plates and the connection shaft member. Consequently, according to the powder resin coating device of the present invention, it is possible to further flatten the powder surface of the powder resin within the bed.

According to the powder resin coating device of the sixth aspect of the present invention, by transmitting the vibration of the housing of the vibration motor to the bottom surface of the bed via the connection shaft member of truncated cone shape provided substantially coaxially with the central axis of the bed, it is possible to transmit the vibration along the vertical direction to the bed concentrically around the first connection part. Consequently, according to the powder resin coating device of the present invention, it is possible to further flatten the powder surface of the powder resin within the bed.

In the powder resin coating device according to the seventh aspect of the present invention, it is possible to make the displacement along the vertical direction of the bed larger than the displacement along the horizontal direction, by setting the distance along the axial direction from the bottom surface of the bed until the edge part of the bed to no more than the diameter of the bed. For this reason, according to the powder resin coating device of the present invention, it is possible to further flatten the powder surface without allowing the powder resin within the bed to spatter.

The powder resin coating method according to the eighth aspect of the present invention immerses a coating site of the workpiece into powder resin stored in this bed, while vibrating the bed using the vibration mechanism connected to the bottom surface of the tank, so that the acceleration along the vertical direction is greater than the acceleration along the horizontal direction of the bed, thereby coating the powder resin onto the coating site. Herein, upon vibrating the bed, by causing the bed to vibrate so that the acceleration along the vertical direction is greater than the acceleration along the horizontal direction, since the bed makes oscillatory motion such that the bottom surface thereof slopes relative to the horizontal plane, it is possible to make the powder surface flat without allowing powder resin within the bed to spatter. In addition, with the powder resin coating method of the present invention, by immersing the coating site of the workpiece in the powder resin for which the powder surface is maintained as flat in this way, since it is possible to form a coating film uniformly on this coating site, it is possible to improve the quality of the final product.

With the powder resin coating method according to the ninth aspect of the present invention, the bed is made to vibrate so that the acceleration and displacement along the vertical direction of the bed both become greater than the acceleration and displacement along the horizontal direction, using the vibration mechanism. It is thereby possible to further make the powder surface flat without allowing powder resin within the bed to spatter, and thus it is possible to further improve the quality of the final product.

With the powder resin coating method according to the tenth aspect of the present invention, air is supplied to the bottom surface of the powder storage unit of the bed, while causing the bed to vibrate using the vibration mechanism connected to the bottom surface of the bed, so that the acceleration and displacement along the vertical direction of the bed increase as approaching the edge part from the center of the bed. In the present invention, by causing the bed to vibrate in this way, since it is possible to increase the bulk density of the powder resin within the bed from the center towards the edge part, more air tends to pass through the center side than the side of the edge part. Therefore, according to present invention, when supplying air to the bottom surface of the powder storage unit, it is possible to form convective flow of powder resin flowing radially from the center to the edge part on the powder surface side, within the bed. Therefore, by immersing the coating site of the workpiece within the bed in which such convective flow of powder resin is formed, and coating the powder resin on the coating site, since it is possible to form a coating film uniformly on the coating site, it is possible to improve the quality of the final product.

DETAILED DESCRIPTION OF THE INVENTION

Figure 1:
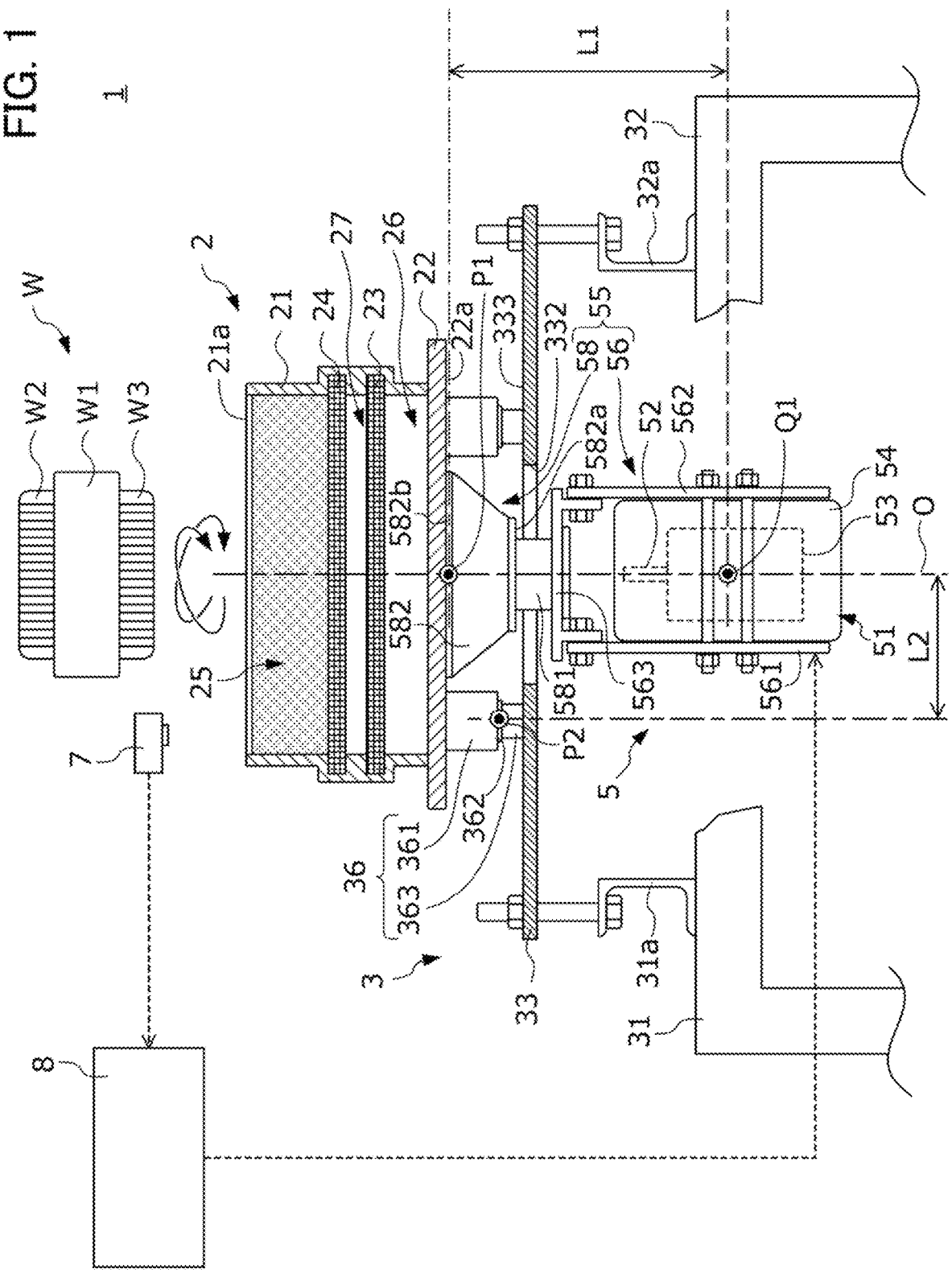
FIG. 1 is a partial cross-sectional view showing the configuration of a powder resin coating device to which a powder resin coating method according to an embodiment of the present invention is applied.

Hereinafter, an embodiment of the present invention will be explained while referencing the drawings. FIG. 1 is a partial cross-sectional view showing the configuration of a powder resin coating device 1 to which a powder resin coating method according to the present embodiment is applied. The powder resin coating device 1 is used in order to form a coating film on a workpiece W based on a fluidized bed coating process, and includes: a powder fluidizing bed 2 that stores powder resin, a stand 3 that supports this powder fluidizing bed 2 on a placement surface (not illustrated), a vibration mechanism 5 connected to the bottom surface 22a of the powder fluidizing bed 2, a level meter 7 that detects a powder surface height in the powder fluidizing bed 2, and a control device 8 that controls the vibration mechanism 5.

It should be noted that a case of defining a stator which is a component of a generator equipped to a vehicle as the workpiece W will be explained hereinafter; however, the present invention is not limited thereto. The workpiece W that is the stator is configured by combining a cylindrical stator core W1, and a stator coil W2 provided in a plurality of slots formed inside of this stator core W. In addition, in the workpiece W, an end of the stator coil W2 downwards in the vertical direction serves as a coating site W3. Hereinafter, a case of using the powder resin coating device 1 to form a coating film of resin on a coating site W3, and conducting insulation coating on this coating site W3 will be explained.

Figure 2:
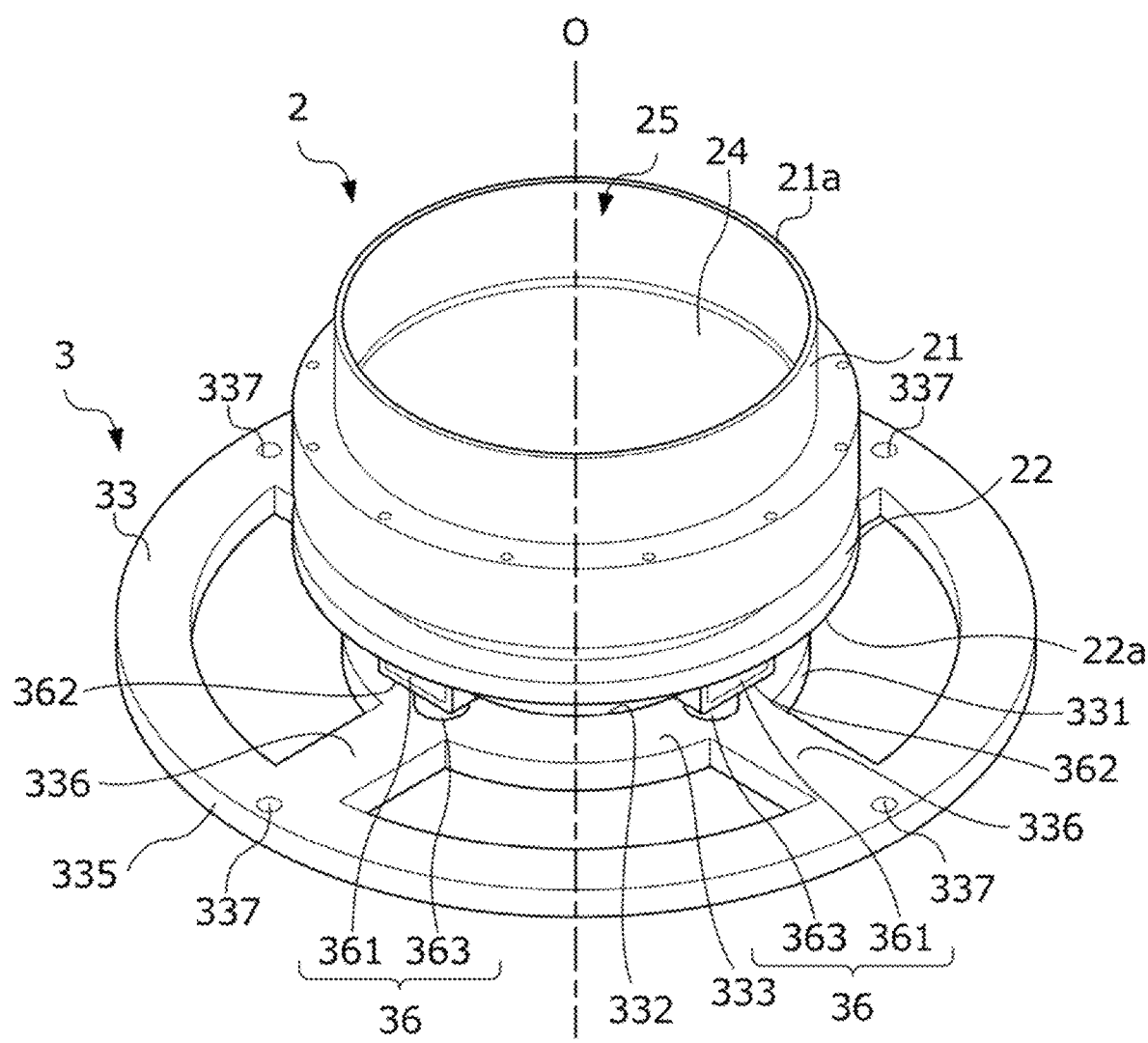
FIG. 2 is a perspective view showing the configuration of a powder fluidizing bed and part of a stand.

FIG. 2 is a perspective view showing the configuration of a powder fluidizing bed 2 and part of a stand 3. The powder fluidizing bed 2 is substantially circular in a plan view. The powder fluidizing bed 2 includes: a cylindrical trunk 21 which extends along a vertical direction, a disc-like base plate 22 provided to the bottom of this trunk 21, and the two of a disc-like first partition plate 23 and second partition plate 24 provided inside of the trunk 21. A porous plate in which countless holes smaller than the particle size of the pulverized powder resin are formed can be used, respectively, in these first and second partition plates 23, 24.

In the powder fluidizing bed 2, a powder storage unit 25 in which pulverized powder resin is stored is formed by the space from this second partition plate 24 until the edge 21a of the trunk 21 with the second partition plate 24 as a base plate. In addition, in the powder fluidizing bed 2, a first air chamber 26 is formed by the space demarcated by the base plate 22 and first partition plate 23, and a second air chamber 27 is formed by the space demarcated by the first partition plate 23 and second partition plate 24. In addition, within the first air chamber 26, the air from an air supply device (not illustrated) is provided. The air supplied into the first air chamber 26 influxes into the second air chamber 27 via the first partition plate 23 which is a porous body, further influxes into the powder storage unit 25 via the second partition plate 24 which is a porous body, and causes the powder resin stored inside this powder storage unit 25 to flow.

It should be noted that, hereinafter, the length along the axis line O from the bottom surface 22a of the powder fluidizing bed 2 until the edge part 21a, i.e. height of the powder fluidizing bed 2, is denoted as "H". In addition, the radius of the powder fluidizing bed 2 is denoted as "r". In addition, the preferred settings of this height H and radius r of the powder fluidizing bed 2 will be described in detail later.

The stand 3 includes: a plurality of columnar fixed frames 31, 32 extending along the vertical direction, a sheet-like fixed plate 33 extending along the horizontal direction, and a plurality of support members 36 which elastically support the powder fluidizing bed 2 to the fixed plate 33.

The ends on the lower side in the vertical direction of the fixed frames 31, 32 are respectively fixed to installation surfaces, which are not illustrated.

The fixed plate 33 is substantially disk shaped in a plan view, and is provided coaxially with the axis line O of the powder fluidizing bed 2. The fixed plate 33 includes: an annular small-diameter plate 331 having a diameter substantially equal to the powder fluidizing bed 2, a large-diameter plate 335 having a diameter larger than the small-diameter plate 331, and a connection plate 336 which extends along the radial direction to connect this small-diameter plate 331 and large-diameter plate 335. A through hole 332 for inserting the vibration mechanism 5 is formed in the small-diameter plate 331. In addition, a plurality of bolt holes 337 is formed in the large-diameter plate 335.

The fixed plate 33 is fixed to the fixed frames 31, 32 by fastening the upper ends 31a, 32a on the upper side in the vertical direction of the fixed frames 31, 32 and the large-diameter plate 335 with a plurality of bolts 338, so that a fixing surface which is a surface of the small-diameter plate 331 on the side of the powder fluidizing tank 2 becomes horizontal.

The support member 36 extends along the vertical direction, and elastically supports this powder fluidizing bed 2 to the fixing surface 333 by connecting the powder fluidizing bed 2 and the fixing surface 333 of the small-diameter plate 331 via an elastic member The support member 36 includes a leg portion 361 fixed to the bottom surface 22a of the powder fluidizing bed 2, and an elastic member 363 which is interposed between a lower end face 362 of the leg portion 361 and the fixing surface 333 of the small-diameter plate 331. For example, rubber is used in the elastic member 363. The support member 36 is provided at the bottom surface 22a of the powder fluidizing bed 2 more to the side of the axis line O than an edge part 21a, as shown in FIGS. 1, 2, etc. In this way, the powder fluidizing bed 2 is connected via the elastic member 363 to the fixing surface 333; therefore, when causing the powder fluidizing bed 2 to vibrate by way of the vibration mechanism 5 described later, it becomes possible to shake the powder fluidizing bed 2 so as to slope relative to the fixing surface 333. It should be noted that, hereinafter, a portion at which the leg portion 351 fixed to the bottom surface 22a of the powder fluidizing bed 2 and the elastic member 363 contact is referred to as a second connection part P2. In addition, the distance along the horizontal direction from the axis line O of the powder fluidizing bed 2 until this second connection part P2 is denoted as "L2". It should be noted that, as shown in FIG. 1 and FIG. 2, the support member 36 is provided in plurality (four in the example of the present application) at equal intervals along the circumferential direction on the bottom surface 22a of the powder fluidizing bed 2.

The vibration mechanism 5 includes a vibration unit 51 serving as a columnar oscillating body, and a connection mechanism 55 that connects the vibration unit 51 and the bottom surface 22a of the powder fluidizing bed 2.

The vibration unit 51 includes a vibration motor 53 having a rotation shaft 52, and a housing 54 which houses this vibration motor 53. The vibration motor 53 causes the rotation shaft 52 to rotate at a frequency according to the control signal from the control device 8. This rotation shaft 52 is connected to the bottom surface 22a of the powder fluidizing bed 2 via the connection mechanism 55 so as to become substantially coaxial with the axis line O of the powder fluidizing tank 2. In addition, an eccentric weight (not illustrated) is attached to this rotation shaft 52. Therefore, when causing the eccentric rotation shaft 52 to rotate by way of the vibration motor 53, the housing 54 vibrates. More specifically, the housing 54 vibrates so that the center point Q1 thereof makes a circular motion centered about the axis line O, within the horizontal plane perpendicular to the axis line O.

The connection mechanism 55 includes a bracket 56 which retains the housing 54, and a connection shaft member 58 which extends substantially coaxially with the axis line O and connects the bracket 56 and the bottom surface 22a of the powder fluidizing bed 2.

The bracket 56 includes a sheet-like first support plate 561 and second support plate 562 extending in parallel with each other and in parallel to the axis line O, and a third support plate 563 which is sheet-like extending along the horizontal direction, and connecting ends of these support plates 561, 562 on an upper side in the vertical direction. The first support plate 561 and second support plate 562 each are respectively connected to a pair of opposing sides of the housing 54. In addition, the distances along the horizontal direction from the rotation shaft 52 to the first support plate 561 and second support plate 562 are equal. In other words, the housing 54 is sandwiched equally by the two support plates 561, 562 centered about the rotation shaft 52. In addition, as shown in FIG. 1, the housing 54 is retained by the bracket 56, so as to be positioned more to the lower side in the vertical direction than the fixed plate 33.

The connection shaft member 58 includes a shaft part 581 which extends substantially coaxially with the axis line O and a connection part 582, and connects the bracket 56 provided more to the lower side in the vertical direction than the fixed plate 33 and the bottom surface 22a of the powder fluidizing bed 2 provided more to the upper side in the vertical direction than the fixed plate 33. The connection part 582 is a truncated cone shape, and expands in diameter as approaching towards a circular bottom 582b on the bottom surface 22a side of the powder fluidizing bed 2 from a circular top surface 582a on the bracket 56 side. The lower end side in the vertical direction of the shaft part 581 is fixed to the third support plate 563 of the bracket 56, and the upper end side in the vertical direction is fixed to the circular top surface 582a of the connection part 582. In addition, the circular bottom 582b of the connection part 582 is fixed to the bottom surface 22a of the powder fluidizing bed 2. It should be noted that, hereinafter, the center of the circular bottom 582b of the connection part 582 contacting the bottom 22a of the powder fluidizing bed 2 is referred to as first connection part P1. In addition, the distance along the axis line O from the center point Q1 of the housing 54 until the first connection part P1 thereof is denoted as "L1".

In addition, in the connection shaft member 58, the outside diameter of the circular bottom 582b of the connection part 582 that is the largest diameter is smaller than the inside diameter of the through hole 332 formed at the center of the fixed plate 33. For this reason, even in a case of the housing 54 vibrating in the above-mentioned way, the connection shaft member 58 is made so as not to contact with the fixed plate 33. Therefore, the vibrations occurring in the housing 54 transmit to the powder fluidizing bed 2 via the bracket 56 and connection shaft member 58 without being dampened by the fixed plate 33.

The level meter 7 is provided at an upper side of the powder fluidizing bed 2. The level meter 7 detects the height of the powder surface of powder resin stored in the powder fluidizing bed 2 (more specifically, distance along axis line O from a predetermined reference (e.g., edge part 21a), based on a triangulation ranging method, for example, and sends a signal according to the detected value to the control device 8. More specifically, the level meter 7 transmits a laser beam towards a predetermined measurement position within the powder fluidizing bed 2 from a light source, and measures the height of the powder surface at the measurement position, based on the position at which the laser beam reflected by the powder surface images on the photodetector.

The control device 8 determines the target for the air supply amount to the first air chamber 26 from the air supply device and the target for the frequency of the vibration motor 53 such than flattens the powder surface within the powder fluidizing bed 2 in accordance with a program determined in advance, and drives the air supply device and vibration motor 53 so that these targets are realized.

Next, the vibration mode of the powder resin realized inside the powder fluidizing bed 2 of the powder resin coating device 1 will be explained by referencing FIGS. 3A to 3C.

Figure 3A:
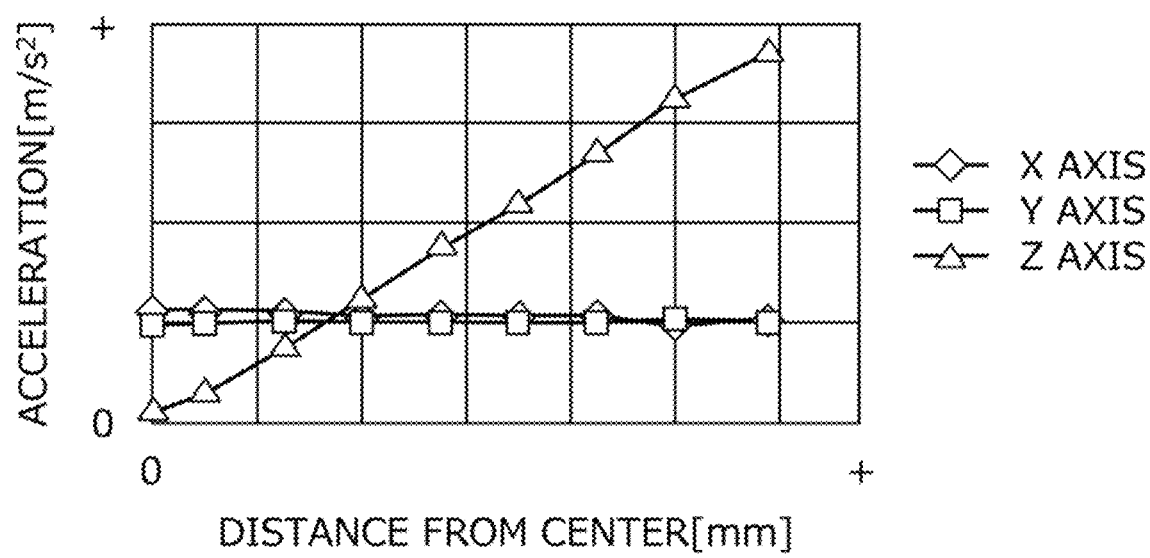
FIG. 3A is a graph showing measurement results of a distribution of acceleration applied to powder resin within the powder fluidizing bed.

FIG. 3A is a graph showing measurement results of a distribution of acceleration applied to powder resin within the powder fluidizing bed 2. FIG. 3B is a graph showing measurement results of a distribution of displacement of powder resin within the powder fluidizing bed 2. FIGS. 3A and 3B are results of the above-mentioned powder resin coating device 1 obtained in the case of elastically supporting the bottom surface 22a of the powder fluidizing bed 2 to the fixing surface 33 by the support member 36, and causing the powder fluidizing bed 2 to vibrate by transmitting the vibrations generated by the vibration unit 51 to the center of the bottom surface 22a of the powder fluidizing bed 2 via the connection mechanism 55. In addition, FIG. 3C is a graph viewing the powder fluidizing bed from above, and showing measurement positions of acceleration and displacement. As shown in FIG. 3C, nine of the measurement points of acceleration and displacement were set at equal intervals along the radial direction from the center until the edge part 21a in the powder fluidizing bed 2. In addition, the X axis and Y axis are axes parallel to the horizontal plane, and the Z axis is an axis parallel to the vertical direction.

Figure 3B:
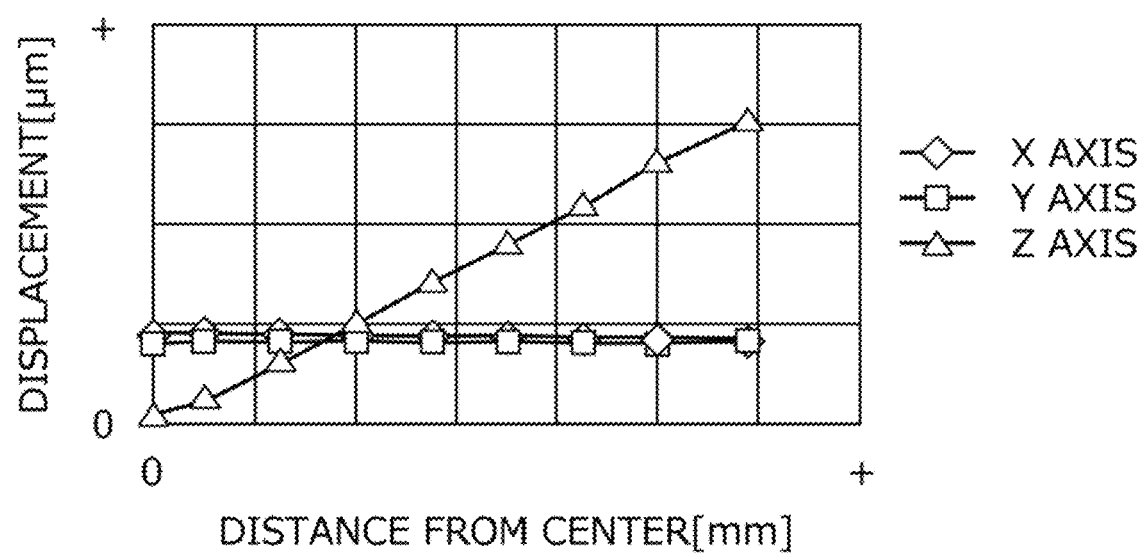
FIG. 3B is a graph showing measurement results of a distribution of displacement acting on powder resin within the powder fluidizing bed.
Figure 3C:
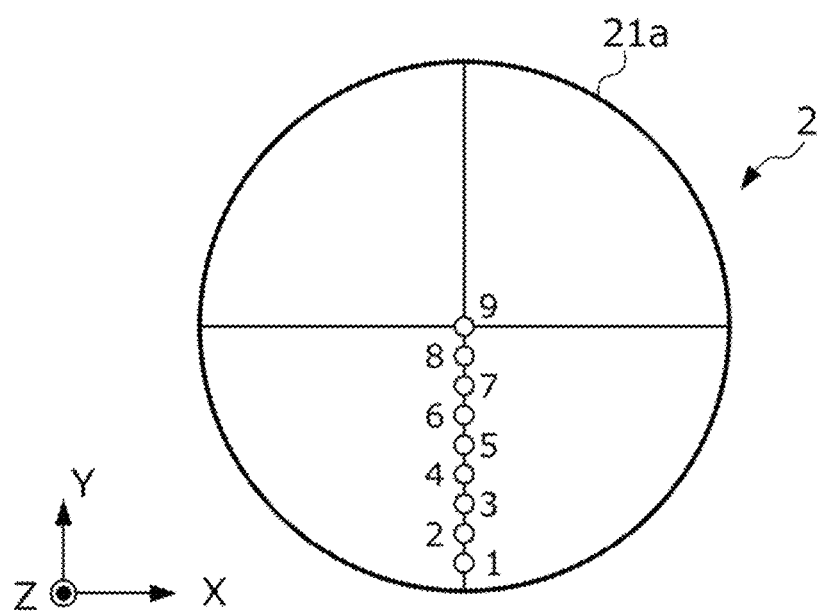
FIG. 3C is a graph viewing the powder fluidizing bed from above, and showing a measurement position of acceleration and displacement.

As shown in FIGS. 3A and 3B, the displacement and acceleration of vibration along the horizontal direction of the powder resin are both mostly constant irrespective of the distance from the center of the powder fluidizing bed 2. In contrast, the acceleration and displacement along the vertical direction of powder resin within the powder fluidizing bed 2 become larger as approaching towards the edge part 21a from the center of the powder fluidizing bed 2.

Next, convective flow of powder resin realized within the powder fluidizing bed 2 of the powder resin coating device 1 will be explained by referencing FIGS. 4A to 4C.

Figure 4A:
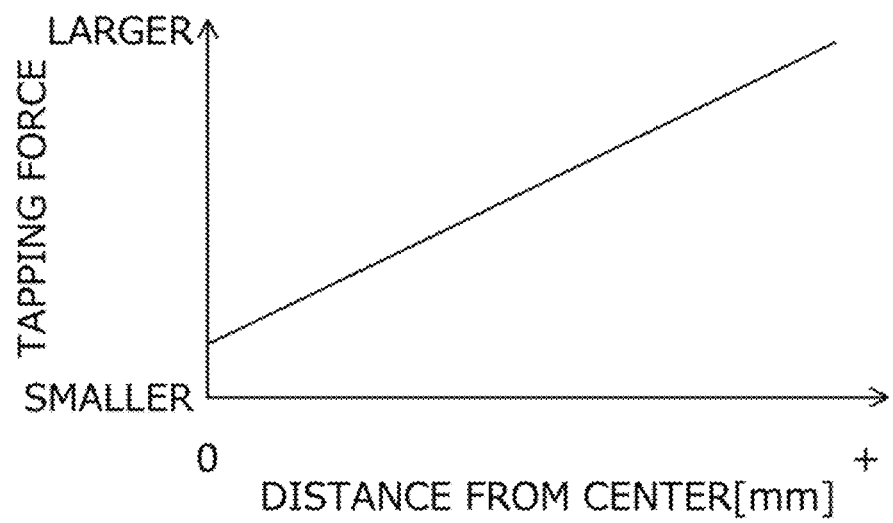
FIG. 4A is a graph showing the distribution of tapping force acting on the powder resin within the powder fluidizing bed.
Figure 4B:
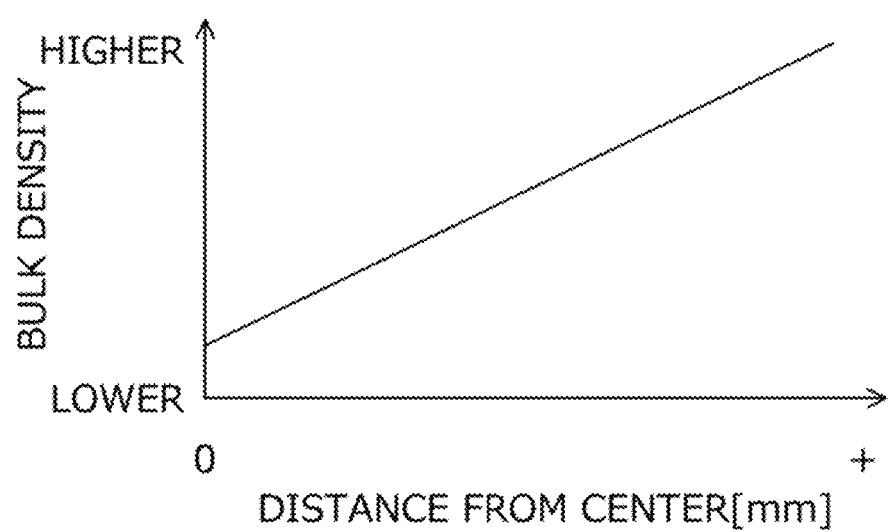
FIG. 4B is a graph showing the distribution of bulk density of powder resin within the powder fluidizing bed.

FIG. 4A is a graph schematically showing the distribution of tapping force acting on powder resin within the powder fluidizing bed 2; and FIG. 4B is a graph schematically showing the distribution of bulk density of powder resin within the powder fluidizing bed 2.

According to the powder resin coating device 1 of the present embodiment, the acceleration and displacement along the vertical direction of the powder resin within the powder fluidizing bed 2 can realize vibrations such that increase as approaching the edge part 21a from the center of the powder fluidizing bed 2. For this reason, the tapping force acting on the powder resin within the powder fluidizing bed 2 becomes larger as approaching the side of the edge part 21a from the center, as shown in FIG. 4A. In addition, the bulk density of powder resin within the powder fluidizing bed 2 thereby becomes higher as approaching the edge part 21a from the center of the powder fluidizing bed 2, as shown in FIG. 4B.

Figure 4C:
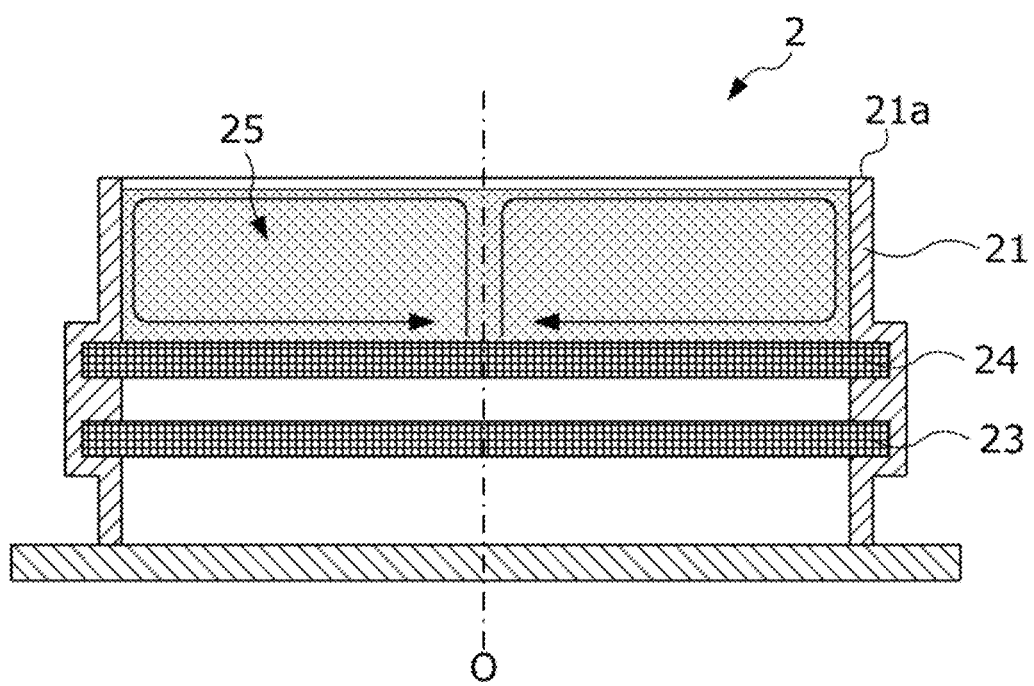
FIG. 4C is a view schematically showing convective flow formed within the powder fluidizing bed.

FIG. 4C is a view schematically showing convective flow formed within the powder fluidizing bed 2. As mentioned above, the bulk density of powder resin within the powder fluidizing bed 2 becomes lowest at the center of the powder fluidizing bed 2. For this reason, the air tends to pass through the most at the center of the powder fluidizing bed 2. For this reason, inside the powder storage unit 25 of the powder fluidizing bed 2, when supplying air from the second partition plate 24, which is the bottom surface thereof, convective flow of powder resin flowing radially from the center to the side of the edge part 21a is generated at the powder surface side within the powder fluidizing bed 2, as shown by the arrows in FIG. 4C. By way of this convective flow, a flat powder surface is formed within the powder fluidizing bed 2.

Next, the preferred setting ranges of the distances L1, L2 in the above such powder resin coating device 1, and height H and radius r of the powder fluidizing bed 2 will be explained.

Figure 5:
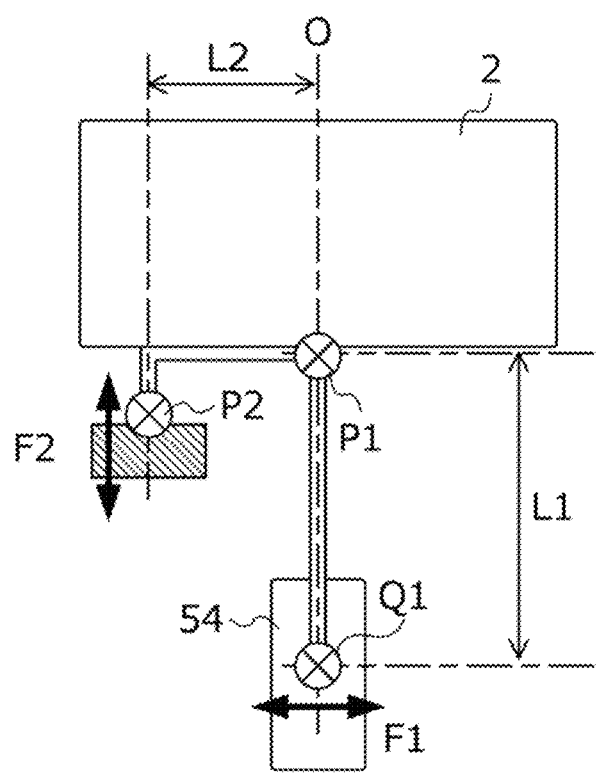
FIG. 5 is a view for explaining forces acting on the powder fluidizing bed during vibration of a housing.

FIG. 5 is a view for explaining forces acting on the powder fluidizing bed 2 during vibration of the housing 54. As shown in FIG. 5, when defining the center point Q1 as the point of force application, defining the first connection part P1 as a fulcrum, and defining the second connection part P2 as a working point, if a force F1 along the horizontal direction is applied to the center point Q1, a force F2 along the vertical direction will act on the powder fluidizing bed 2. At this time, the force F2 causing the powder fluidizing bed 2 to vibrate along the vertical direction, when using the distance L1 from the point of force application until the fulcrum and the distance L2 from the fulcrum until the working point, can be expressed as $F2=(L1/L2) \times F1$. In other words, it is possible to make the powder fluidizing bed 2 to vibrate more strongly along the vertical direction as lengthening the distance L1 and shortening the distance L2.

In addition, in order to flatten the powder surface within the powder fluidizing bed 2, it is effective to make the vibration acceleration along the vertical direction of the powder fluidizing tank 2 greater than the vibration acceleration along the horizontal direction, as explained by referencing FIGS. 9 to 12 later. Therefore, the present embodiment makes the distance L1 along the axis line O from the center point Q1 of the housing 54 until the first connection part P1 longer than the distance L2 along the horizontal direction from the axis line O until the second connection part P2, so that it is possible to make the vibration acceleration along the vertical direction of the powder fluidizing tank 2 larger than the vibration acceleration along the horizontal direction.

Figure 6:
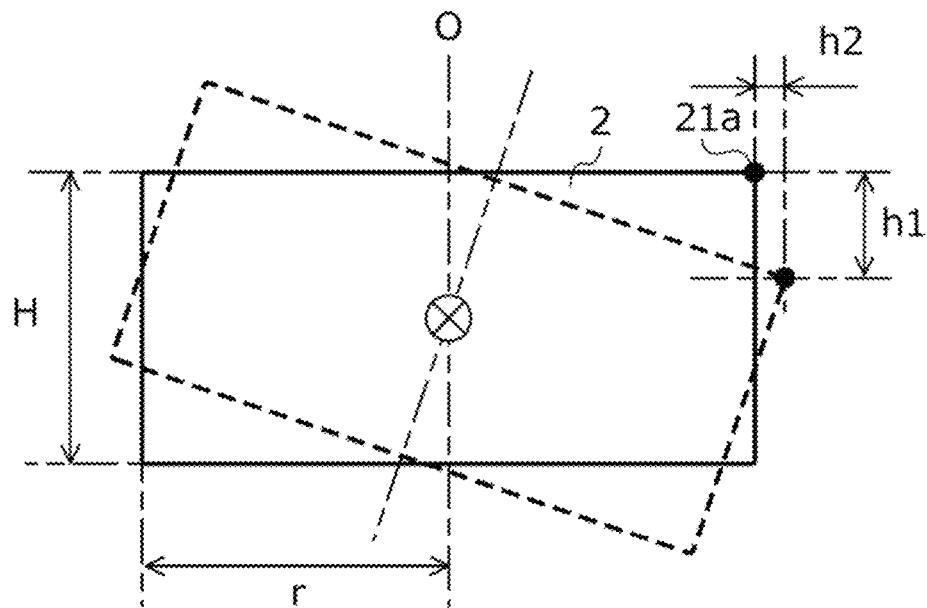
FIG. 6 is a view for explaining a relationship between magnitude of displacement along a vertical direction and horizontal direction of an edge part when the powder fluidizing bed tilts by vibration, and the magnitude of height and radius of the powder fluidizing bed.

FIG. 6 is a view for explaining a relationship between the magnitude of displacement along the vertical direction and horizontal direction of the edge part 21a when the powder fluidizing bed 2 tilts by vibration, and the magnitudes of height H and radius r of the powder fluidizing bed 2. As shown in FIG. 6, when the powder fluidizing bed 2 tilts by the vibrations generated by the vibration mechanism 5, the edge part 21a displaces by "h1" along the vertical direction, and displaces by "h2" along the horizontal direction (radial direction). In addition, the ratio of these displacements h1 to h2 will change according to the ratio of height H to radius r of the powder fluidizing bed 2.

Figure 7:
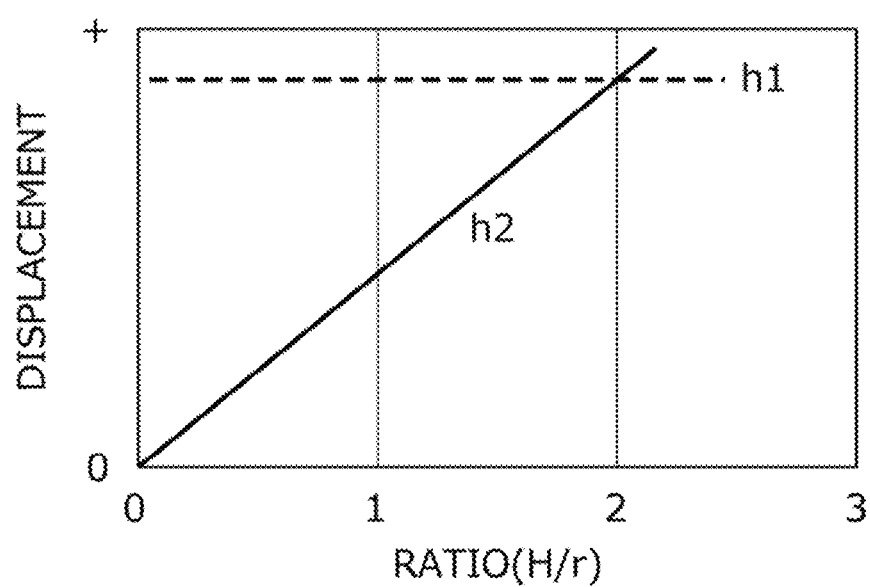
FIG. 7 is a graph showing a relationship between a ratio of height and radius of the powder fluidizing bed and the displacement along the horizontal direction.

FIG. 7 is a graph showing a relationship between a ratio (H/r) of height H and radius r of the powder fluidizing bed 2 and the displacement h2 along the horizontal direction. It should be noted that the angle of tilting the powder fluidizing bed 2 varies according to the ratio H/r of the height and radius so that the displacement h1 along the vertical direction becomes constant in FIG. 7. As shown in FIG. 7, the displacement h2 along the horizontal direction becomes larger as the ratio H/r of the height and radius becomes larger. In addition, when the ratio H/r becomes larger than 2, i.e. when the height H becomes larger than the diameter 2r, the displacement h2 along the horizontal direction will be larger than the displacement h1 along the vertical direction.

In addition, in order to flatten the powder surface within the powder fluidizing bed 2, it is effective to make the displacement along the vertical direction of the powder fluidizing bed 2 larger than the displacement along the horizontal direction, as explained by referencing FIGS. 9 to 12 later. Therefore, in the present embodiment, the height H of the powder fluidizing bed 2 shall be no more than the diameter 2r thereof, so as to be able to make the displacement along the vertical direction of the powder fluidizing bed 2 larger than the displacement along the horizontal direction.

Figure 8:
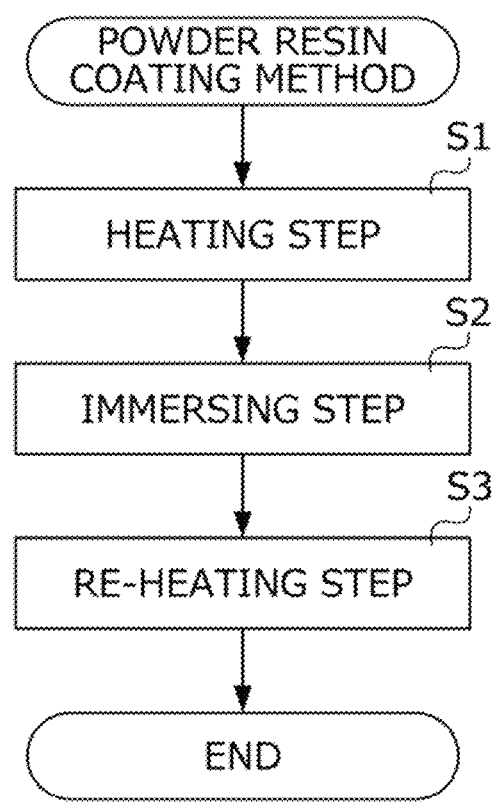
FIG. 8 is a flowchart showing a sequence of a powder resin coating method according to the embodiment.

Next, the specific sequence of the powder resin coating method according to the present embodiment will be explained. FIG. 8 is a flowchart showing the sequence of the powder resin coating method. As shown in FIG. 8, the powder resin coating method includes a heating step (S1), immersion step (S2), and re-heating step (S3).

First, in the heating step (S1), the workpiece W is heated up to a predetermined temperature. Next, the immersion step (S2) immerses the coating site W3 of the heated workpiece W in the powder resin stored within the powder fluidizing bed 2, while forming convective flow of powder resin such as that shown in FIG. 4C, within the powder fluidizing bed 2, by using the vibration mechanism 5 and air supply device, thereby causing the powder resin to deposit on the coating site W3. In particular, upon immersing the coating site W3 in the powder resin stored in the powder fluidizing bed 2 in this immersion step, the powder fluidizing bed 2 is made to vibrate using the vibration mechanism 5 so that the vibration acceleration and displacement along the vertical direction of the powder fluidizing bed 2 are both greater than the vibration acceleration and displacement along the horizontal direction, while supplying a predetermined amount of air using the air supply device. It should be noted that, in the case of using the above-mentioned powder resin coating device 1, by setting the distance L1 to longer than distance L2, and setting the height H of the powder fluidizing bed 2 to no more than the diameter 2r in the aforementioned way, it is possible to cause the powder fluidizing bed 2 to vibrate so that the vibration acceleration and displacement along the vertical direction of the powder fluidizing bed 2 are greater than the vibration acceleration and displacement along the horizontal direction. In addition, the re-heating step (S3) lifts up the workpiece W from the powder fluidizing bed 2, and further heats this workpiece W again, thereby forming a coating film of resin on the coating site W3.

Next, experiments performed and the results thereof for verifying the correlation existing between the vibration acceleration and displacement of the powder fluidizing bed 2 and the change in powder surface of the powder resin stored in the powder fluidizing bed 2 will be explained while referencing FIGS. 9 to 12.

Figure 9:
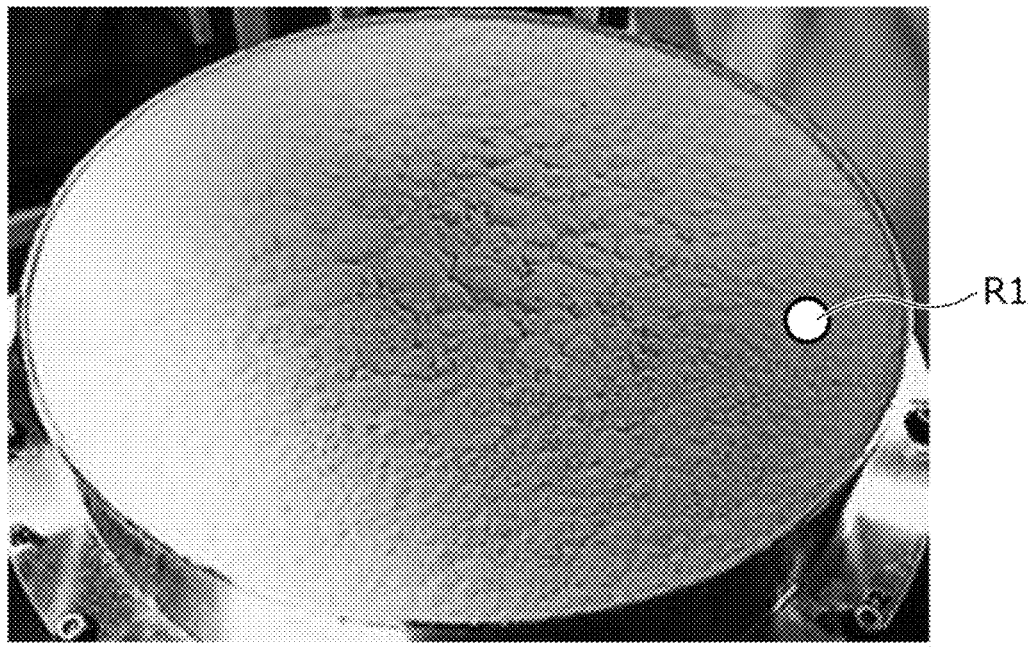
FIG. 9 is a view showing a state of a powder surface within the powder fluidizing bed in a case of vibrating the powder fluidizing bed according to a powder resin coating method of a comparative example.
Figure 10:
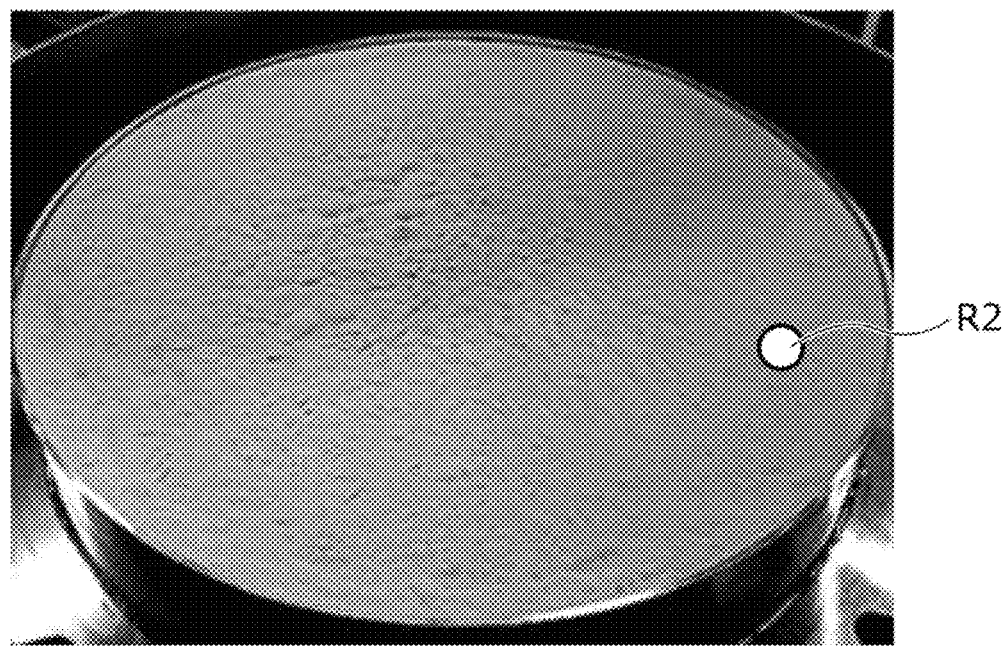
FIG. 10 is a view showing a state of a powder surface within the powder fluidizing bed in a case of vibrating the powder fluidizing bed according to the powder resin coating method of an example.

FIG. 9 is a view showing the state of the powder surface within the powder fluidizing bed in the case of vibrating the powder fluidizing bed according to the powder resin coating method of a Comparative Example. In addition, FIG. 10 is a view showing the state of the powder surface within the powder fluidizing bed in the case of vibrating the powder fluidizing bed according to the powder resin coating method of the Example.

It should be noted that, with the powder resin coating method of the Comparative Example, the powder fluidizing bed was vibrated under a vibration acceleration and displacement such as those shown in Table 1 described later. Herein, the vibration acceleration and displacement of the powder fluidizing bed were measured using a sensor installed to the edge part thereof. In addition, in the table described later, the Z axis is an axis parallel to the vertical direction, and the X axis and Y axis are axes parallel to the horizontal plane. More specifically, the X axis is an axis parallel to the circumferential direction, and the Y axis is an axis parallel to the radial direction. As shown in Table 1 described later, with the powder resin coating method of the Comparative Example, the vibration acceleration and displacement along the vertical direction of the powder fluidizing bed are both set smaller than the vibration acceleration and displacement along the horizontal direction.

|  | Vibration acceleration [m/sec²] | Displacement [μm] |
|---|---|---|
| X axis | 13.6 | 96.1 |
| Y axis | 13.2 | 93.6 |
| Z axis | 12.8 | 91 |

In addition, with the powder resin coating method of the Example, the powder fluidizing bed was vibrated under a vibration acceleration and displacement such as those shown in Table 2 described later. As shown in Table 2 described later, with the powder resin coating method of the Example, the vibration acceleration and displacement along the vertical direction of the powder fluidizing bed were both set to larger than the vibration acceleration and displacement along the horizontal direction.

|  | Vibration acceleration [m/sec²] | Displacement [μm] |
|---|---|---|
| X axis | 12.8 | 90.4 |
| Y axis | 12.0 | 85.1 |
| Z axis | 17.8 | 126.1 |

As is clear by comparing this FIG. 9 and FIG. 10, the case of vibrating the powder fluidizing bed based on the powder resin coating method of the Example can more completely flatten the powder surface than the case of vibrating the powder fluidizing bed based on the powder resin coating method of the Comparative Example.

Figure 11:
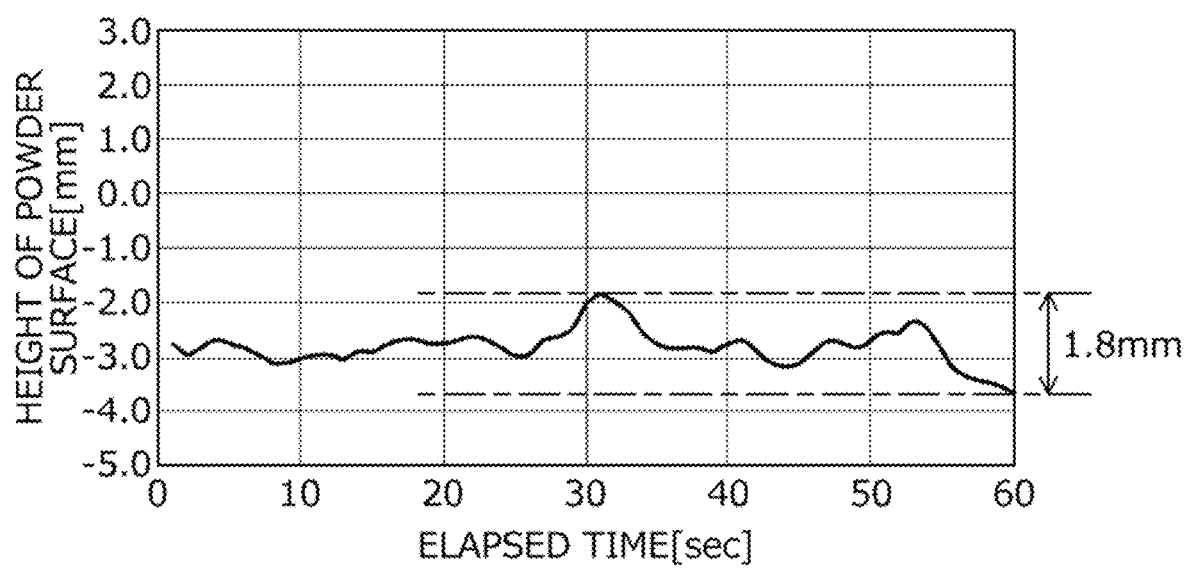
FIG. 11 is a graph showing the time course of the height of the powder surface at a predetermined measurement position in the powder fluidizing bed in the case of vibrating the powder fluidizing bed according to the powder resin coating method of the comparative example.
Figure 12:
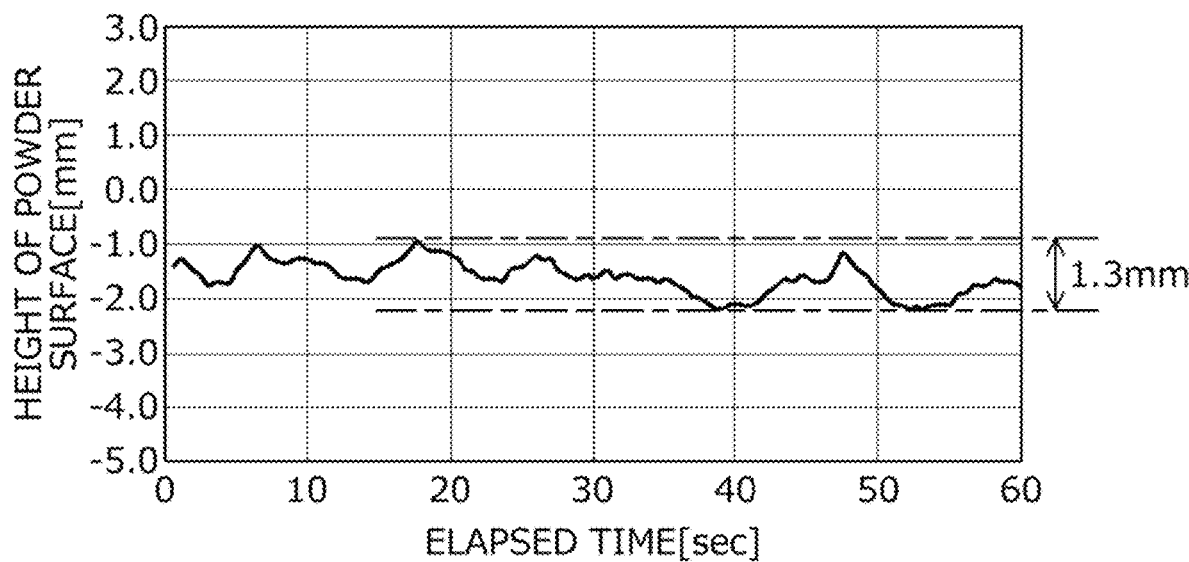
FIG. 12 is a graph showing the time course of the height of the powder surface at a predetermined measurement position in the powder fluidizing bed in the case of vibrating the powder fluidizing bed according to the powder resin coating method of the example.

FIG. 11 is a graph showing the time course of the height of the powder surface at a predetermined measurement position (position R1 in FIG. 9) in the powder fluidizing bed in the case of vibrating the powder fluidizing bed according to the powder resin coating method of the Comparative Example. In addition, FIG. 12 is a graph showing the time course of the height of the powder surface at a predetermined measurement position (position R2 in FIG. 10) in the powder fluidizing bed in the case of vibrating the powder fluidizing bed according to the powder resin coating method of the Example. According to the powder resin coating method of the Comparative Example, the fluctuation range in the powder surface was 1.8 mm. In contrast, according to the powder resin coating method of the Example, the fluctuation range in the powder surface was 1.3 mm.

According to the powder resin coating method of the present embodiment which causes the powder fluidizing bed to vibrate so that the vibration acceleration and displacement along the vertical direction of the powder fluidizing bed are both greater than the vibration acceleration and displacement along the horizontal direction in the above way, it is possible to make the powder surface flat, and reduce the fluctuation range thereof.

According to the present embodiment, the following effects are exerted.

(1) According to the powder resin coating device 1, the vibration unit 51 is connected to the bottom surface 22a of the powder fluidizing bed 2 which stores the powder resin via the connection mechanism 55, and this powder fluidizing bed 2 is further connected to the fixing surface 333 via the support member 36. In particular, with the powder resin coating device 1, the support member 36 elastically supports the powder fluidizing bed 2 to the fixing surface 333. For this reason, the powder resin coating device 1 can realize oscillatory movement of the bed in which the vibration along the horizontal direction and vibration along the vertical direction are integrally combined when vibrating the vibration unit 51. For this reason, according to the powder resin coating device 1, it is possible to make the powder surface flat without allowing the powder resin within the powder fluidizing bed 2 to spatter.

(2) As explained by referencing FIGS. 9 to 12, etc., it is possible to effectively flatten the powder resin within the powder fluidizing bed 2, when realizing the oscillatory movement in which the vibration along the vertical direction is larger than the vibration along the horizontal direction. Therefore, in the powder resin coating device 1, the support member 36 is installed more inwards in the radial direction than the edge part 21a of the powder fluidizing bed 2. Since it is thereby possible to make the amplitude of vibration along the vertical direction of the powder fluidizing bed 2 larger compared to a case of installing the support member 36 more outwards in the radial direction than the edge part 21a of the powder fluidizing bed 2, the powder surface can be made flat without allowing the powder resin within the powder fluidizing bed 2 to spatter.

(3) The powder resin coating device 1 configures the vibration unit 51 by the vibration motor 53 having the eccentric rotation shaft 52, and the housing 56 which accommodates this. In addition, this vibration motor 53 is connected to the bottom surface 22a of the powder fluidizing bed 2 via the connection mechanism 55 so that the rotation shaft 52 becomes substantially coaxial with the axis line O of the powder fluidizing bed 2. It is thereby possible to easily realize oscillatory movement of the powder fluidizing bed 2, and thus possible to further flatten the powder surface of powder resin within the powder fluidizing bed 2.

(4) In the powder resin coating device 1, the distance L1 along the axis line O from the center point Q1 of the housing 54 of the vibration motor 53 until the first connection part P1 of the bottom surface 22a of the powder fluidizing bed 2 is longer than the distance L2 along the horizontal direction from the axis line O of the powder fluidizing bed 2 until the second connection part P2. For this reason, when causing the vibration motor 53 to rotate, the powder fluidizing bed 2 vibrates at greater acceleration along the vertical direction than the horizontal direction, and as a result thereof, makes oscillatory movement such that the bottom surface 22a of the powder fluidizing bed 2 slopes relative to the fixing surface 333 about the first connection part P1. For this reason, according to the powder resin coating device 1, it is possible to make the powder surface flat without allowing the powder resin within the powder fluidizing bed 2 to spatter.

(5) According to the powder resin coating device 1, the housing 54 is equally sandwiched by at least two support plates 561, 562 centered about the rotation shaft 52 thereof. Therefore, when causing the eccentric rotation shaft 52 to rotate by the vibration motor 53, it is possible to equally transmit the vibration along the vertical direction centered about the first connection part P1 to the bottom surface 22a of the powder fluidizing bed 2, via the above-mentioned two support plates 561, 562 and the connection shaft member 58. Consequently, according to the powder resin coating device 1, it is possible to further flatten the powder surface of the powder resin within the powder fluidizing bed 2.

(6) According to the powder resin coating device 1, by transmitting the vibration of the housing 54 to the bottom surface 22a of the powder fluidizing bed 2 via the connection shaft member 58 of truncated cone shape provided substantially coaxially with the axis line O of the powder fluidizing bed 2, it is possible to transmit the vibration along the vertical direction to the powder fluidizing bed 2 concentrically around the first connection part P. Consequently, according to the powder resin coating device 1, it is possible to further flatten the powder surface of the powder resin within the powder fluidizing bed 2.

(7) In the powder resin coating device 1, it is possible to make the displacement along the vertical direction of the powder fluidizing bed 2 larger than the displacement along the horizontal direction, by setting the height H of the powder fluidizing bed 2 to no more than the diameter 2r of the powder fluidizing bed 2. For this reason, according to the powder resin coating device 1, it is possible to further flatten the powder surface without allowing the powder resin within the powder fluidizing bed 2 to spatter.

(8) With the powder resin coating method, by causing the powder fluidizing bed 2 to vibrate so that the acceleration along the vertical direction is greater than the acceleration along the horizontal direction, since the powder fluidizing bed 2 makes oscillatory motion such that the bottom surface 22a thereof slopes relative to the horizontal plane, it is possible to make the powder surface flat without allowing powder resin within the powder fluidizing bed 2 to spatter. In addition, with the powder resin coating method, by immersing the coating site W3 of the workpiece W in the powder resin for which the powder surface is maintained as flat in this way, since it is possible to form a coating film uniformly on this coating site W3, it is possible to improve the quality of the final product.

(9) With the powder resin coating method, the powder fluidizing bed 2 is made to vibrate so that the acceleration and displacement along the vertical direction of the powder fluidizing bed 2 both become greater than the acceleration and displacement along the horizontal direction, using the vibration mechanism 5. It is thereby possible to further make the powder surface flat without allowing powder resin within the powder fluidizing bed 2 to spatter, and thus it is possible to further improve the quality of the final product.

(10) With the powder resin coating method, air is supplied to the second partition plate 24, which is a base plate of the powder storage unit 25 of the powder fluidizing bed 2, while causing the powder fluidizing bed 2 to vibrate using the vibration mechanism 5 connected to the bottom surface 22a of the powder fluidizing bed 2, so that the acceleration and displacement along the vertical direction of the powder fluidizing bed 2 increase as approaching the edge part 21a from the center of the powder fluidizing bed 2. By causing the powder fluidizing bed 2 to vibrate in this way by the powder resin coating method, since it is possible to increase the bulk density of the powder resin within the powder fluidizing bed 2 from the center towards the edge part 21a, more air tends to pass through the center side than the side of the edge part 21a. Therefore, according to the powder resin coating method, when supplying air to the bottom surface of the powder storage unit 25, it is possible to form convective flow of powder resin flowing radially from the center to the edge part 21a on the powder surface side, within the powder fluidizing bed 2. Therefore, by immersing the coating site W3 of the workpiece within the powder fluidizing bed 2 in which such convective flow of powder resin is formed, and coating the powder resin on the coating site W3, since it is possible to form a coating film uniformly on the coating site W3, it is possible to improve the quality of the final product.

Although an embodiment of the present invention has been explained above, the present invention is not to be limited thereto. The configurations of detailed parts may be modified as appropriate within the scope of the gist of the present invention.

What is claimed is:

1. A powder resin coating method for coating a powder resin onto a workpiece using a powder resin coating device which includes a bed storing powder resin and a vibration mechanism equipped with an oscillating body provided on a bottom surface side of the bed and a connection mechanism that connects the oscillating body and the bottom surface and transmits the vibration generated by the oscillating body to the bed, the method comprising:
    immersing a coating site of the workpiece in the powder resin stored within the bed, while vibrating the bed using the vibration mechanism so that acceleration along a vertical direction is greater than acceleration along a horizontal direction at an edge part of the bed and that acceleration along the vertical direction is less than acceleration along the horizontal direction at a center of the bed, thereby coating powder resin onto the coating site.

2. The powder resin coating method according to claim 1, wherein the bed is made to vibrate using the vibration mechanism upon immersing the coating site of the workpiece in the powder resin stored in the bed, so that acceleration and displacement along the vertical direction at the edge part are both greater than acceleration and displacement along the horizontal direction at the edge part and that acceleration and displacement along the vertical direction at the center are both less than acceleration and displacement along the horizontal at the center.

3. A powder resin coating method for coating a powder resin onto a workpiece using a powder resin coating device which includes a bed storing powder resin and a vibration mechanism equipped with an oscillating body provided on a bottom surface side of the bed and a connection mechanism that connects the oscillating body and the bottom surface and transmits the vibration generated by the oscillating body to the bed, the method comprising:
    supplying air to a bottom surface of a powder storage unit of the bed, while causing the bed to vibrate using the vibration mechanism so that acceleration and displacement along a vertical direction of the bed increase from a center of the bed towards an edge part of the bed, and immersing a coating site of the workpiece into powder resin which is stored within the bed, thereby coating powder resin onto the coating site.

* * * * *